(12) United States Patent
Jin et al.

(10) Patent No.: US 7,274,700 B2
(45) Date of Patent: Sep. 25, 2007

(54) ROUTER PROVIDING DIFFERENTIATED QUALITY OF SERVICE (QOS) AND FAST INTERNET PROTOCOL PACKET CLASSIFYING METHOD FOR THE ROUTER

(75) Inventors: Seung-eui Jin, Daejon (KR); Tae-il Kim, Daejon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1058 days.

(21) Appl. No.: 10/256,000

(22) Filed: Sep. 26, 2002

(65) Prior Publication Data

US 2003/0214948 A1 Nov. 20, 2003

(30) Foreign Application Priority Data

May 18, 2002 (KR) .............................. 2002-27594

(51) Int. Cl.
*H04L 12/28* (2006.01)
(52) U.S. Cl. ...................... 370/392; 370/401; 370/230; 709/238
(58) Field of Classification Search ...................... None
See application file for complete search history.

(56) References Cited

U.S. PATENT DOCUMENTS

| | | | |
|---|---|---|---|
| 5,740,175 A | | 4/1998 | Wakeman et al. |
| 6,041,053 A | | 3/2000 | Douceur et al. |
| 6,104,700 A | * | 8/2000 | Haddock et al. ............ 370/235 |
| 6,167,445 A | * | 12/2000 | Gai et al. ................... 709/223 |
| 6,272,133 B1 | | 8/2001 | Bialkowski et al. |
| 6,594,268 B1 | * | 7/2003 | Aukia et al. ................. 370/400 |
| 6,628,610 B1 | * | 9/2003 | Waclawsky et al. ........ 370/229 |
| 6,674,743 B1 | * | 1/2004 | Amara et al. ............... 370/351 |
| 6,678,248 B1 | * | 1/2004 | Haddock et al. ............ 370/235 |
| 6,747,968 B1 | * | 6/2004 | Seppala et al. ............. 370/338 |
| 6,772,223 B1 | * | 8/2004 | Corl et al. ................... 709/238 |
| 6,898,641 B1 | * | 5/2005 | Kobayashi ................... 709/238 |
| 6,993,031 B2 | * | 1/2006 | Murase ................... 370/395.32 |
| 7,002,965 B1 | * | 2/2006 | Cheriton ................. 370/395.32 |
| 2002/0046284 A1 | * | 4/2002 | Brabson et al. ............. 709/228 |
| 2002/0046291 A1 | | 4/2002 | O'Callaghan et al. |
| 2002/0191622 A1 | * | 12/2002 | Zdan .......................... 370/401 |
| 2003/0046423 A1 | * | 3/2003 | Narad et al. ................. 709/238 |
| 2004/0213224 A1 | * | 10/2004 | Goudreau .................... 370/389 |

OTHER PUBLICATIONS

IEEE Network, Mar./Apr. 2001, ClassiPI: An Architecture for Fast and Flexible Packet Classification, S. Iyer, et al., 9 pages.

(Continued)

*Primary Examiner*—Bob A. Phunkulh
(74) *Attorney, Agent, or Firm*—Blakely Sokoloff Taylor & Zafman

(57) ABSTRACT

A router for supporting differentiated qualities of service (QoS), and a fast Internet protocol (IP) packet classification method performed in the router, are provided. The router hierarchically divides a memory having flow tables into a fast internal cache memory and an external typical memory. The internal cache memory stores recently searched table entries. The router preferentially searches the flow tables of the internal cache memory. Only when the internal cache memory searching fails, the flow tables of the external memory are searched. Consequently, the frequency of interactions between a packet classifier and the external memory decreases to improve the speed of packet classification.

32 Claims, 7 Drawing Sheets

OTHER PUBLICATIONS

"Fast and Scalable Layer Four Switching", V. Srinivasan, et al., 12 pages.

Center for Integrated Systems at Stanford University and the Alfred P. Sloan Foundation, "Packet Classification on Multiple Fields", P. Gupta and N. McKeown, 14 pages.

"High-Speed Policy-based Forwarding Using Efficient Multi-dimensional Range Matching", T.V. Lakshman and d. Stiliadis, Bell Laboratories, 14 pages.

"Packet Classification using Tuple Space Search", V. srinivasan, et al, Computer Science Dept., Washington University, St. Louis, 18 pages.

"Tradeoffs for Packet Classification", A. Feldmann, S. Muthukrishnan, AT & T Labs-Research, 10 pages.

2000 IEEE, "Classifying Packets with Hierarchical Intelligent Cuttings", P. Gupta, N. McKeown, 8 pages.

* cited by examiner

ROUTER PROVIDING DIFFERENTIATED QUALITY OF SERVICE (QOS) AND FAST INTERNET PROTOCOL PACKET CLASSIFYING METHOD FOR THE ROUTER

BACKGROUND OF THE INVENTION

1. Field of the Invention

The present invention relates to an Internet protocol (IP) packet classifying method, and more particularly, to a fast IP packet classifying method invented to provide a differentiated quality of service (QoS).

2. Description of the Related Art

Most recent commonly used routers do not provide differentiated services depending on the characteristics of transferred data because they are designed to provide a simple best-effort service. For quality-controllable Internet services, a router must be able to support admission control of every incoming packet, and resource reservation, per-flow queuing, and fair scheduling of the incoming packets.

A differentiated service is established based on the rules defining the condition of incoming packets to belong to each flow, and its corresponding action. A function unit in which packets are classified according to flows and processed based on such a rule set is referred to as a packet classifier.

In practice, the rules applied to respective packet flows are managed in the form of flow tables by a router. Accordingly, in order to provide differentiated services for packet flows, every packet arrival requires a flow table search. The Internet Engineering Task Force, an Internet standard organization, advises that the flow table search should be based on 6 multiple field values of a packet header, including among others source and destination IP addresses, source and destination TCP/UDP port numbers, IP protocol type and differentiated service code point (DSCP).

However, this search based on such multiple fields for every packet arriving to a router acts as an operation load on the routing. Specifically, with an increase in the packet processing speed required, the operation load generated by the above-described packet classification also increases. This requires new approaches to reduce the operation load caused by the above-described packet classification.

SUMMARY OF THE INVENTION

To solve the above-described problems, it is an object of the present invention to provide a router capable of maximizing the performance of packet classification by minimizing the operation load in a routing process generated due to packet classification, and also provide a fast Internet protocol (IP) packet classification method performed in the router.

In the router, a quality-of-service (QoS) policy client transforms a QoS policy received from a QoS policy server system into QoS resource control data. A flow table processor establishes a plurality of flow tables in response to the QoS resource control data. A packet classifier classifies incoming packets according to flow on the basis of the data stored in the flow tables and generates operation codes. A QoS resource controller controls each of the incoming packets to be forwarded on a flow-by-flow basis in response to the operation codes and controls the scheduling of outgoing resources.

Preferably, the router further includes a first memory for storing the plurality of flow tables. Preferably, in the packet classifier, a multi-field search key extractor extracts multi-field data about the incoming packets. A differential class classifier classifies the incoming packets according to differential classes. A plurality of differential class flow table searchers search for the data in the flow tables for respective differential classes. A second memory stores recently searched table entries among the data in the flow tables. A partition controller controls the sizes of the partitions of the second memory in units of differential classes. A plurality of memory matchers provide an interface enabling to search the flow tables included in the first memory if the second memory is not successfully searched. An output signal mediator mediates the results of the flow table search so that they are sequentially output.

In the packet classification method, a multi-field search key is extracted from an incoming packet. A differential service code point field is extracted from the extracted multi-field search key. The incoming packet is classified according to differential classes in response to the extracted differential service code point field. A first flow table group corresponding to the differential service code point field is searched in response to the multi-field search key. If the first flow table group search succeeded, operation codes are extracted from the successful search result. On the other hand, if the first flow table group search failed, a second flow table group corresponding to the differential service code point field is searched in response to the multi-field search key, and operation codes are extracted from the second flow table group search result. Here, the first flow table group is stored in a first memory and the second flow table group is stored in a second memory.

Preferably, the packet classification method further includes the following steps of: classifying the first memory into an upper service group and a lower service group, partitioning the upper and lower service groups, and correcting the period for partitioning each of the upper and lower service groups.

Preferably, in order to partition each of the upper and lower service groups, first of all, a service rate is calculated from the frequency of services of each differential class in the lower service group provided. Then, a partition correction amount for each differential class in the lower service group is calculated. If the partition correction amounts are negative, differential classes having the negative partition correction amounts in the lower service group are listed. Thereafter, a memory space corresponding to the partition correction amount for each of the listed differential classes is excluded from the partitioned memory. On the other hand, if the partition correction amounts are positive, differential classes having the positive partition correction amounts in the lower service group are listed. Thereafter, a memory space corresponding to the partition correction amount for each of the listed differential classes is added to the partitioned memory.

In order to correct the partitioning period, first of all, the hit frequency for each differential class is calculated. Next, the hit frequency for all differential classes is calculated in response to the calculated hit frequency for each differential class. Thereafter, an actual hit frequency is obtained by summing the hit frequencies for respective differential classes. An estimated hit frequency is obtained by multiplying a pre-set desired hit rate by the number of packets incoming during a given period. A period correction amount is calculated by subtracting the estimated hit frequency from the actual hit frequency. A set period value is updated by adding the set period value to the period correction value. The value of a period counter is set as the set period value.

BRIEF DESCRIPTION OF THE DRAWINGS

The above object and advantages of the present invention will become more apparent by describing in detail a pre ferred embodiment thereof with reference to the attached drawings in which.

DETAILED DESCRIPTION OF THE INVENTION

Figure 1:
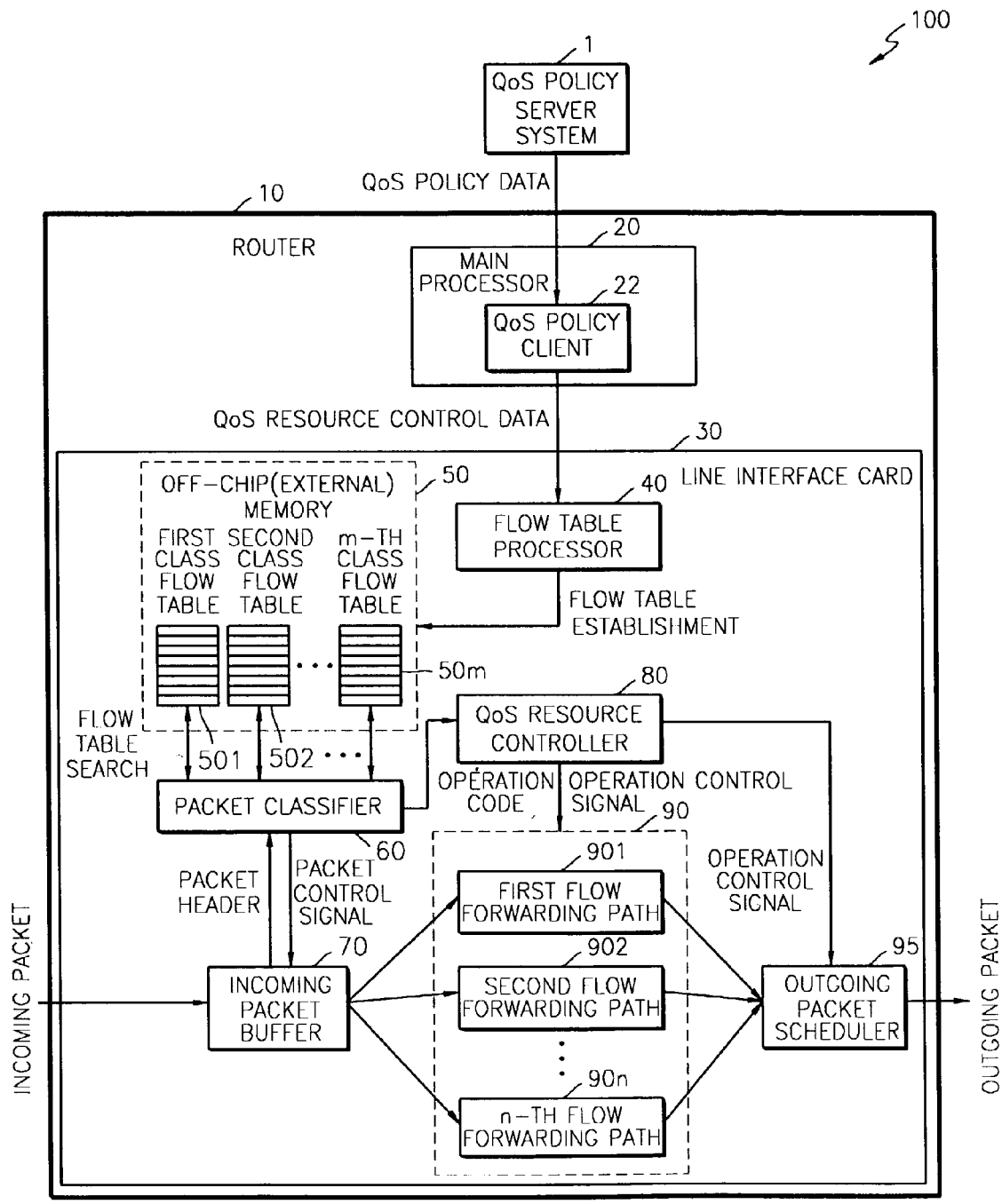
FIG. 1 is a block diagram of a quality of service (QoS) policy-based network including a router according to a preferred embodiment of the present invention.

Referring to FIG. 1, a quality of service (QoS) policy-based network 100 is roughly comprised of a QoS policy server system 1 and a router 10. The QoS quality server system 1 integrates and manages QoS policies relevant to QoS resource control data associated with the router 10. To do this, the QoS policy server system 1 downloads a QoS policy to the router 10 on the basis of the most significant abstracted policy managed by a network manager.

The router 10 connects separated networks using a single transmission protocol, and is roughly comprised of a main processor 20 and a line interface card 30. The router 10 performs high-speed IP packet classification in order to provide differential QoS services for respective packets arriving to the line interface card 30.

The principal operation of the IP packet classification is to retrieve a packet classification data table (hereinafter referred to as a flow table) predefined in the downloaded QoS policy and acquiring the QoS resource control data (hereinafter referred to as an operation code) on a packet. The number of search entries in a flow table is on a continuous increasing trend due to a demand toward the diversification and subdivision of QoS policies by the Internet Service Provider that consider the profitability through Internet.

To be more specific, the main processor 20 includes a QoS policy client 22, and controls the operations of a packet classifier 60 and a packet output scheduler 95 both included in the line interface card 30. The QoS policy client 22 transforms the QoS policy received from the QoS policy server system 1 into QoS policy resource control data, and mediates the QoS resource control data to the line interface card 30.

The line interface card 30 includes a flow table processor 40, an off-chip (external) memory 50 having first through m-th class flow tables 501 through 50m, a packet classifier 60, an incoming packet buffer 70, a QoS resource controller 80, a forwarding path 90 having first through n-th flow forwarding paths 901 through 90n, and the packet scheduler 965. Here, m and n are integers equal to or greater than 1.

The first through m-th class flow tables 501 through 50m store QoS resource control data for respective flows provided from the QoS policy client 22. The flow table processor 40 establishes and manages the first through m-th class flow tables 501 through 50m (661 through 66m of FIG. 2) on the line interface card 30 in response to the QoS resource control data received from the QoS policy client 22. The packet classifier 60 classifies fast received packets according to flow on the basis of the data on the first through m-th class flow tables 501 through 50m. The incoming packet buffer 70 temporarily stores packets while packet classification is performed. The first through n-th flow forwarding paths 901 through 90n forward packets classified by flows. The outgoing packet scheduler 95 multiplexes the forwarded packets and schedules outgoing packets of the line interface card 30. The QoS resource controller 80 controls the operations of the first through n-th flow forwarding paths 901 through 90n and the outgoing packet scheduler 95 in response to the operation code of a corresponding flow generated through packet classification by the packet classifier 60.

In the QoS policy-based network 100, first of all, the QoS policy server system 1 provides QoS policy data to the QoS policy client 22 included in the main processor 20. The QoS policy client 22 reconstructs QoS resource control data based on the QoS policy data, and transfers the QoS resource control data to the line interface card 30. In the line interface card 30, the flow forwarding paths 901 through 90n each perform a traffic control mechanism adequate for a corresponding flow, and the packet scheduler 95 at the output port controls the use of an output bandwidth in order to provide differentiated qualities of service for different flows.

To be more specific, the flow table processor 40 in the line interface card 30 receives the QoS resource control data from the QoS policy client 22, classifies the received QoS resource control data into differential classes (e.g., a classification condition, the combination shape of a corresponding action, etc.), and stores the differential classes in the first through m-th class flow tables 501 through 50m.

Figure 3:
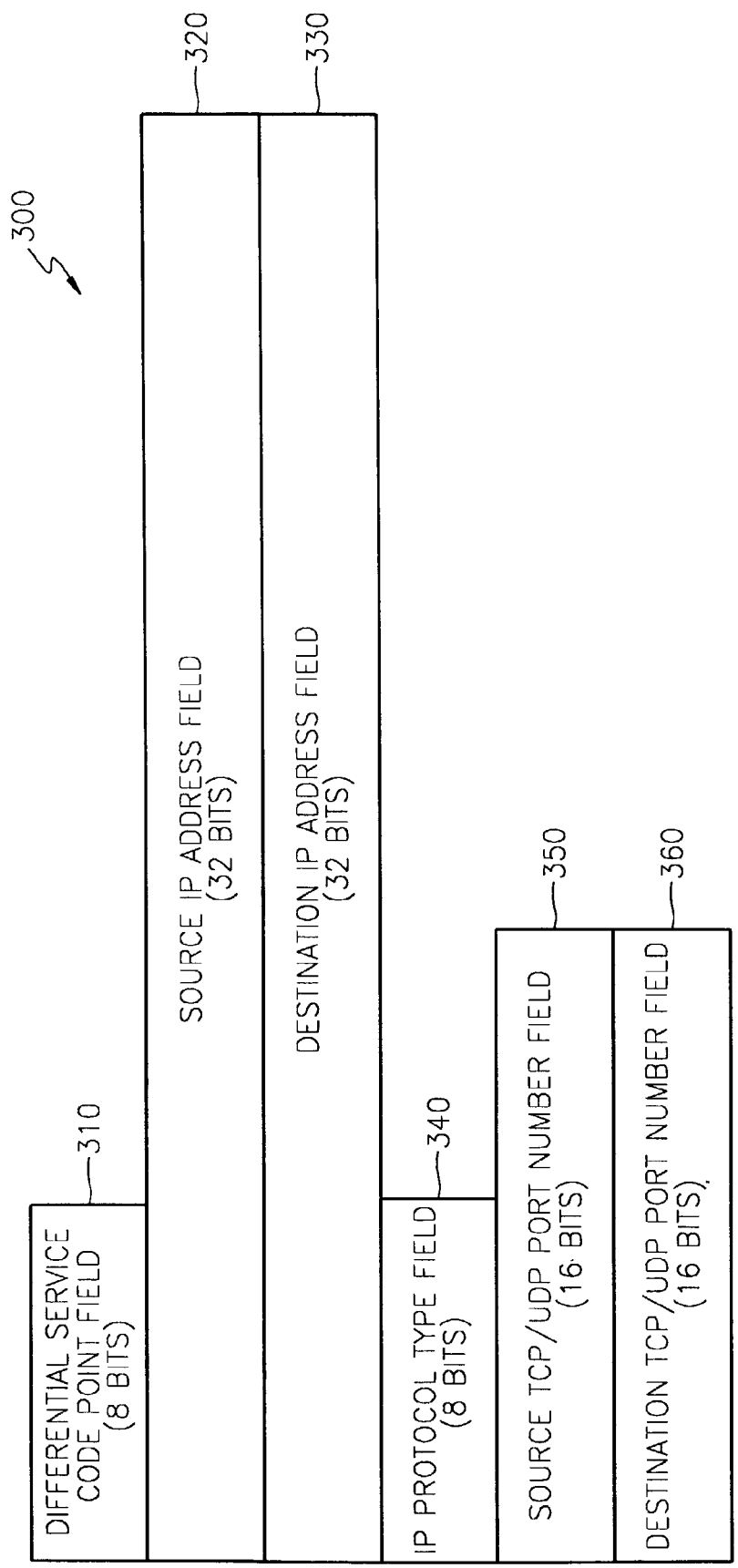
FIG. 3 shows the structure of a multiple-field search key for use in packet classification.

The first through m-th class flow tables 501 through 50 are established on the off-chip (external) memory 50 separately existing outside the packet classifier 60, and classified according to differential class on the basis of a differential service code point value of FIG. 3. Here, if the number of differential classes determined by the QoS policy server system 1 is m, the number of flow tables established on the line interface card 30 is also m.

The packet classifier 60 classifies packets arriving to the flow tables 501 through 50m according to flow. The packet classification includes a process for selecting one from the first through n-th flow forwarding paths 901 through 90n by searching the first through m-th class flow tables 501 through 50m with respect to every packet arriving to the line interface card 30, and a process for controlling the operations of the first through n-th flow forwarding paths 901 through 90n and the outgoing packet scheduler 95 by the QoS resource controller 80.

Such a packet classification process is performed based on the header data of a packet. During packet classification, the whole of a packet is temporarily stored in the incoming packet buffer 70. When the packet classifier 60 concludes the packet classification process for the corresponding packet and outputs a packet control signal to the incoming packet buffer 70, the packet stored in the incoming packet buffer 70 is sent to the first through n-th flow forwarding paths 901 through 90n. Each of the flow forwarding paths 901 through 90n of FIG. 1 is presented in an abstraction of an actual processing action defined for each flow. Here, the actual processing action is defined as dropping a packet or remarking the differential service code point field value in a packet header in order to adjust the class of a service.

Upon packet classification, searching all of the table entries of each differential class flow table by accessing the off-chip (external) memory 50 existing outside the packet classifier 60 with respect to every incoming packet can act as a significant load upon a router system. Hence, in order to solve this problem, the router 10 according to the present invention stores recently searched table entries in an on-chip (cache) memory 660 of FIG. 2, which exists within the packet classifier 60. As a result, the frequency of interactions between the packet classifier 60 and the off-chip (external) memory 50 is reduced, improving the speed of packet classification.

In the present invention, the router 10 is loaded with on-chip memory and off-chip memory in consideration of hardware implementation. The on-chip memory denotes fast small-capacity cache memory installed within the packet classifier 60, and the off-chip memory denotes a general large-capacity memory, such as dynamic random access memory (DRAM), installed outside the packet classifier 60. The algorithm and control structure of an on-chip memory is applied to the cache memory, and the algorithm and control structure of an off-chip memory is applied to the general external memory. Such a packet classification algorithm according to the present invention can be implemented in both hardware and software.

Figure 2:
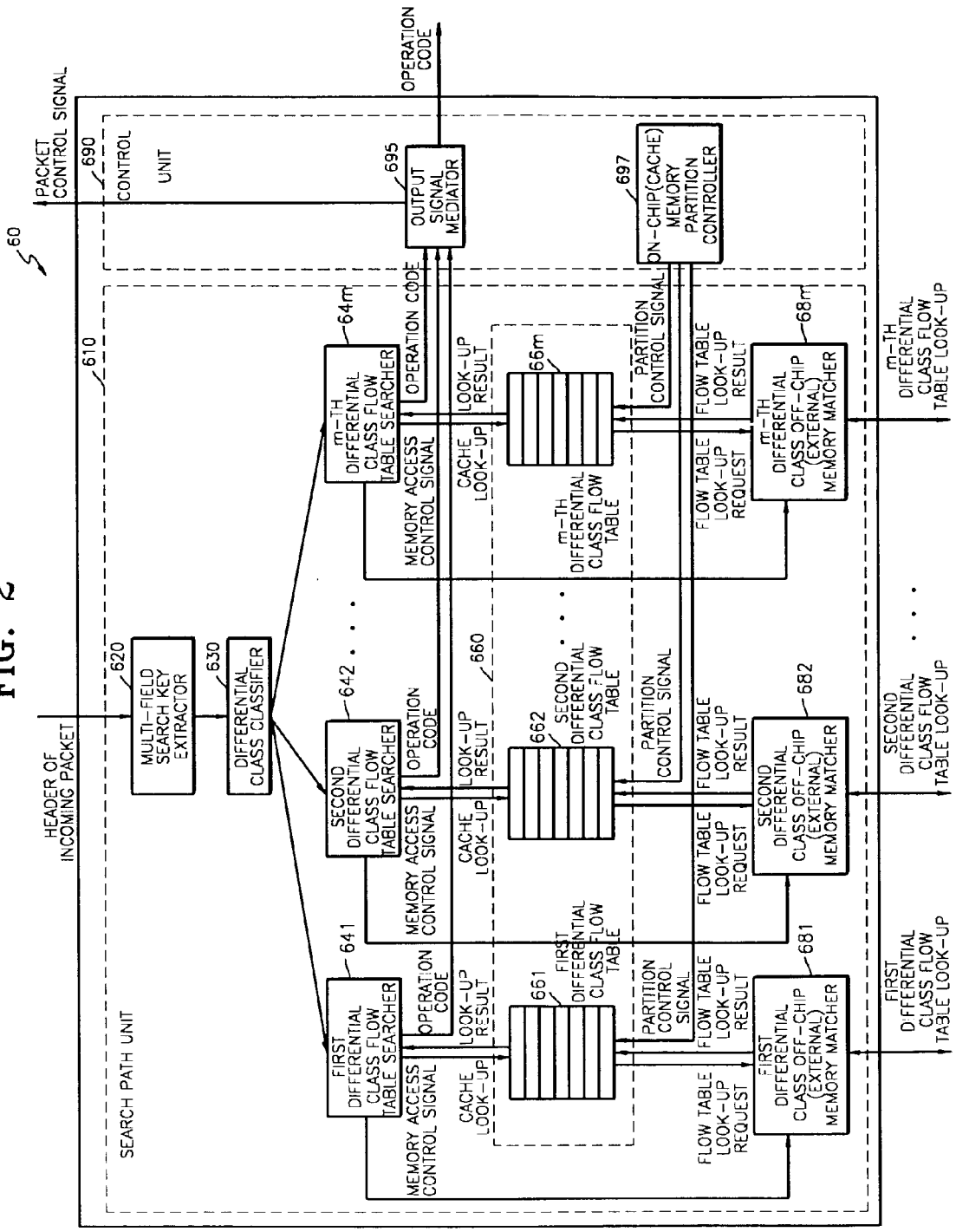
FIG. 2 is a detailed block diagram of the packet classifier of FIG. 1.

FIG. 2 is a detailed block diagram of the packet classifier 60 of FIG. 1. Referring to FIG. 2, the packet classifier 60 is largely composed of a search path unit 610 and a control unit 690.

The search path unit 610 searches the flow tables with respect to each incoming packet to determine how to process a corrresponding flow. The search path unit 610 includes a multi-field search key extractor 620, a differential class classifier 630, a plurality of differential class flow table searchers 641 through 64m, an on-chip (cache) memory 660 having a plurality of differential class flow tables 661 through 66m, and a plurality of differential class off-chip (external) memory matchers 681 through 68m.

The multi-field search key extractor 620 extracts the multi-field data from the header of an in coming packet to create a multi-field search key 300 of FIG. 3.

FIG. 3 shows the structure of the multi-field search key for use in packet classification. Referring to FIG. 3, the multi-field search key 300 has 6 fields: a differential service code point field 310, source and destination IP address fields 320 and 330, an IP protocol type field 340, and source and destination TCP/UDP port number fields 350 and 360. The differential service code point field 310 has one byte, the source and destination IP address fields 320 and 330 each have four bytes, the IP protocol type field 340 has one byte, and the source and destination TCP/UDP port number fields 350 and 360 have four bytes each.

Referring back to FIG. 2, the differential class classifier 630 performs differential class classification in an exact matching manner based on the differential service code point field 310 of the multi-field search key 300 created by the multi-field search key extractor 620.

The first through m-th differential class flow table searchers 641 through 64m search the first through m-th differential class flow tables 661 through 66m in parallel. The first through m-th differential class flow tables 661 through 66m, which are established according to differential class on the on-chip (cache) memory 660, store recently searched table entries. The first through m-th differential class flow tables 661 through 66m are partitioned so that they are matched with the first through m-th class flow tables 501 through 50m included in the off-chip (external) memory 50.

If the on-chip (cache) memory 660 fails to search the flow tables 661 through 66m, the first through m-th differential class off-chip (external) memory matchers 681 through 68m search the first through m-th class flow tables 501 through 50m included in the off-chip (external) memory 50 in response to flow table look-up requests from the first through m-th differential class flow table searchers 641 through 64m. If searching of the on-chip (cache) memory 660 succeeds, flow table look-up results are stored in the flow tables 661 through 66m of the on-chip (cache) memory 660.

The control unit 690 includes an output signal mediator 695 and an on-chip (cache) memory partition controller 697, and monitors and controls the operation of a search path. The output signal mediator 695 stores the operation codes output from the first through m-th differential class flow table searchers 641 through 64m in its internal buffer (not shown) having a First In First Out (FIFO) structure. Also, the output signal mediator 695 sequentially outputs the stored operation codes to the QoS resource controller 80 and, at the same time, sends a packet control signal to the incoming packet buffer 70 so that a packet is transferred to an appropriate forwarding path among the first through n-th flow forwarding paths 901 through 90n. The on-chip (cache) memory partition controller 697 classifies all differential classes into upper and lower service groups. The upper service group is equally divided, and the lower service group is unequally divided in proportion to how frequently each class received a service. This improves the flow search function. Control unit 690's adjustment and management of the sizes of partitions to be allocated to the first through m-th differential class flow table searchers 641 through 64m will be described in detail later with reference to FIGS. 5, 6 and 7.

The packet classifier 60 according to the present invention independently processes classes on the basis of the differential service code point field 310. Consequently, differential classes are searched in parallel. Hence, as long as consecutively incoming packets do not belong to the same differential class, they can be processed without need to wait until the preceding packet is completely classified.

When searching the flow tables 661 through 66m on the on-chip (cache) memory 660 fails and the flow tables 501 through 50m on the off-chip (external) memory 50 need to be searched, if the packet classifier 60 does not support such parallel searching as described above, there is a probability that a queue in the incoming packet buffer 70 and a delay in packet processing generated during packet classification unnecessarily lengthen. Hence, a pipeline technique is introduced into packet classification in order to solve this problem, thus reducing the overall packet processing time.

The on-chip (cache) memory 660, which operates fast, has frequently referred flow table entries previously copied, making fast flow table searching possible. Each of the flow tables 661 through 66m existing on the cache memory 660, which is a fast internal memory, is partitioned according to different class. The partitions are not just statically maintained but dynamically adjusted based on the result of periodical monitoring of the packet classification performance. Such dynamic partition adjustment increases the probability of succeeding in searching the flow tables in the cache memory.

Seeing the entire packet classification process at intervals of a predetermined period, packet classification is not uniformly performed in all of the differential classes during a specific period. For example, some differential classes are frequently subject to packet classification, and some differential classes have a low packet classification occurrence frequency. Hence, in the present invention, the on-chip (cache) memory partition controller 697 in the control unit 690 controls the number of flow table items to be permanently stationed in the on-chip (cache) memory 660, in consideration of the packet classification occurrence frequency, maximizing the use efficiency of the on-chip (cache) memory 660.

The output signal mediator 695 receives synchronously generated operation codes from the first through m-th differential class flow table searchers 641 through 64m. Here, the operation codes correspond to the result of classification by the packet classifier 60. Then, the output signal mediator 695 temporarily stores the received operation codes in its internal FIFO buffer (not shown), re-arranges the operation codes in an output order, and outputs them to the QoS resource controller 80.

Packets associated with the operation codes must be transferred from the incoming packet buffer 70 to the flow forwarding paths 901 through 90n in synchronization with when the operation codes are output. The output signal mediator 695 transfers a packet control signal to the incoming packet buffer 70 in synchronization with when the operation codes are output, in order to synchronize the transmission of the operation codes with the transmission of packets. The packet control signal contains an identifier for a packet to be transferred and an identifier for a forwarding path for each flow. The incoming packet buffer 70 transfers a packet corresponding to the identifier included in the packet control signal to a flow-forwarding path corresponding to the identifier for a flow-forwarding path included in the packet control signal.

Figure 4:
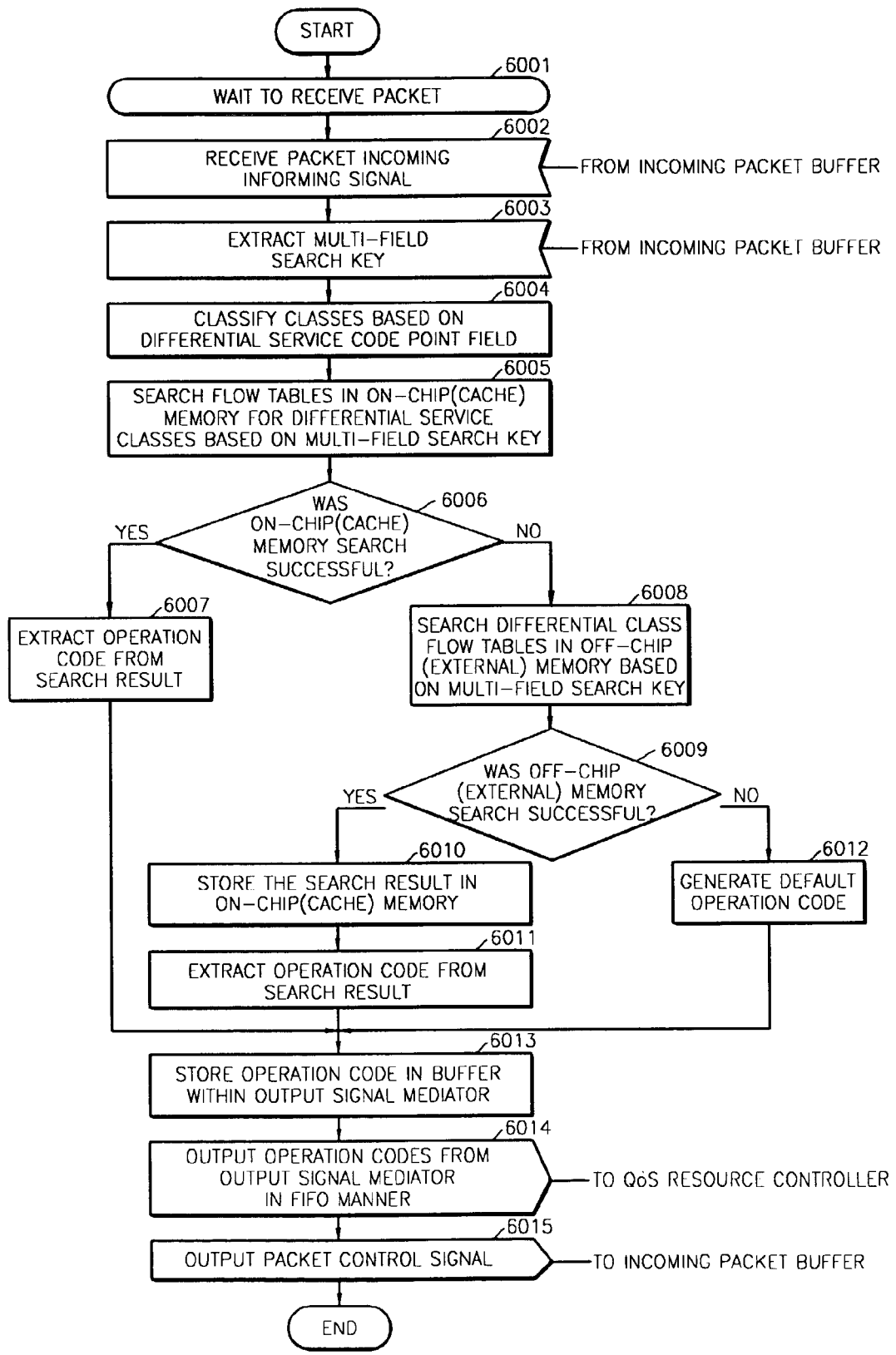
FIG. 4 is a flowchart for illustrating the overall operation of the packet classifier of FIG. 2.

FIG. 4 is a flowchart for illustrating the overall operation of the packet classifier 60 of FIG. 2. The packet classifier 60 classifies packets according to differential classes and accesses flow tables depending on the result of the classification. The method of FIG. 4 relates to classification with respect to an incoming packet and a series of operations associated with the classification. The packet classification by the packet classifier,60 is achieved by repeating an operation of delaying receiving a packet until packet classification is completed and an operation of searching flow tables on the receipt of a packet.

In the present invention, such a series of operations for classification are performed in a pipelined manner. That is, a packet arriving to the line interface card 30 can be processed without waiting for its turn until packet classification including steps 6001 through 6015 is completely performed with respect to the preceding packet. Here, if two consecutive incoming packets do not belong to the same differential class, when a packet finishes a differential class classification step 6004 and is then subject to flow table searching based on a multi-field search key, the next packet can also undergo the differential class classification step 6004 and immediately enter the flow table searching operation including steps 6005 and its later steps. The packet classifier 60 according to the present invention performs multiplex packet classification by a pipelined technique as described above, reducing the overall time of packet processing.

Referring to FIG. 4, first of all, the packet classifier 60 is in a packet receiving waiting state at first, in step 6001. At this time, a packet arrives to the incoming packet buffer 70, and the incoming packet buffer 70 generates a packet incoming informing signal in step 6002. Thereafter, a multi-field search key 300 is extracted from the header of the packet stored in the incoming packet buffer 70, in step 6003. Next, classes are classified based on the differential service code point field 310 extracted from the multi-field search key 300, in step 6004. At this time, a packet incoming informing signal is generated in an interruption form every time a packet arrives to the line interface card 30 and is stored in the incoming packet buffer 70. When the packet incoming informing signal is received by the packet classifier 60, the step 6004 of class classification based on the differential service code point field 310 is automatically performed. That is, events having fixed differential class classification times sequentially happen upon every interruption of packet incoming.

After the step 6004 is completed, packets undergo the process of searching flow tables established according to class, in step 6005. In step 6005, the class flow tables included in the on-chip (cache) memory 660 are searched based on the multi-field search key 300. Subsequently, it is determined whether search of the on-chip (cache) memory 660 is successful, in step 6006.

If it is determined in step 6006 that the search of the on-chip (cache) memory 660 was successful, the operation codes for respective packet flows are extracted from the search result, in step 6007. The step 6007 is followed by step 6013. Here, the search result is composed of the multi-field search key 300 of each packet flow and the operation code thereof. The multi-field search key 300 in the search result is transformed into a locally significant flow label in order to identify each packet flow. A flow label, which is an index for a system to identify a flow forwarding path determined by the above flow table search, is defined as a single fixed value. When such a standardized index is applied to a flow forwarding process, this enables fast flow forwarding.

On the other hand, if it is not determined in step 6006 that the search in the on-chip (cache) memory 660 was successful, the differential class flow tables 501 through 50m in the off-chip (external) memory 50 with which the flow tables in the on-off (cache) memory are matched by the differential class off-chip memory matchers 681 through 68m are searched, in step 6008. Next, it is determined whether the flow tables 501 through 50m were successfully searched, in step 6009.

If it is determined in step 6009 that the off-chip (external) memory search also failed, corresponding packets are determined as undefined packets and default operation codes, which are generally operating codes describing a best-effort service, are generated, in step 6012. The step 6012 is followed by step 6013.

On the other hand, if it is determined in step 6009 that the off-chip (external) memory search succeeded, the search result is stored in the on-chip (cache) memory 660, in step 6010. Then, operation codes are extracted from the search result, in step 6011. The step 6011 is followed by the step 6013. As described above, the result of the off-chip (external) memory search is stored in the on-chip (cache) memory 660 in order that operation codes for an incoming packet having the same multi-field search key 300 as that of the preceding packet are directly obtained from the on-chip (cache) memory 660 without needing to search the flow tables 501 through 50m in the off-chip (external) memory 50. The operation code extraction step 6011 does not affect the line speed.

Since group transmission of packets having the same multi-field search key value generally happens in a recent Internet traffic, storing and re-using most-recently used operation codes in the on-chip (cache) memory 660 is important in improving the performance of packet classification. If the on-chip (cache) memory 660 has no space for loading new items, which are the result of searching of the off-chip (external) memory 50, a space for an item to be newly loaded must be prepared by deleting an item among already-loaded existing items. In the present invention, a least recently used (LRU) algorithm is used for such item deletion. The LRU algorithm deletes the least recently referred item before anything else on the assumption that the least recently referred item is least likely to be referred in the future. The packet classifier 60 according to the present invention improves the probability of succeeding in searching the on-chip (cache) memory 660 through the above-described item deletion using the LRU algorithm.

In step 6013, the packet classifier 60 stores the operation codes for respective packet flows obtained by the off-chip memory search in an FIFO buffer inside the output signal mediator 695. Then, the operation codes are extracted from the FIFO buffer one by one and sequentially transmitted to the QoS resource controller 80, in step 6014. The packet classifier 60 outputs a packet control signal to the incoming packet buffer 70 in synchronization with the transmission of the operation codes so that a packet corresponding to the packet control signal is sent to an appropriate forwarding path among the flow forwarding paths 901 through 90*n* in synchronization with the transmission of the operation codes, in step 6015.

The packet classifier 60 enables most packets to be processed to succeed an on-chip (cache) memory search, thus extracting the operation codes for respective flows directly from the on-chip (cache) memory 660 by skipping steps 6008 through 6011 for searching the off-chip (external) memory 50. Accordingly, the packet classifier 60 maximizes the performance of packet classification. In order to achieve this, the packet classifier 60 increases the probability of successfully searching the on-chip (cache) memory 660, by performing dynamic partition management using the on-chip (cache) memory partition controller 697. Also, the packet classifier 60 provides an improved performance so that the operation codes for respective flows are extracted without affecting the line speed.

Figure 5:
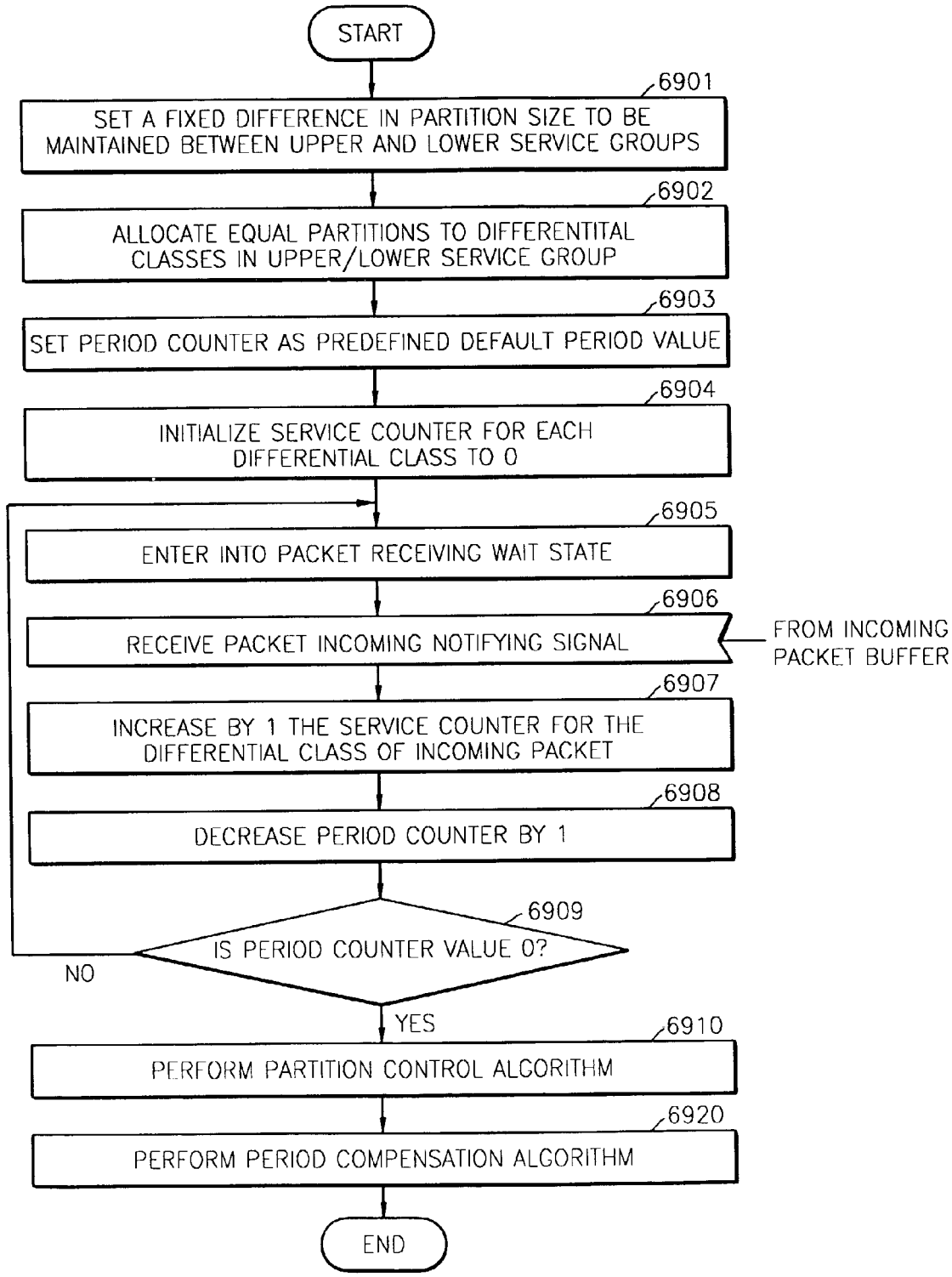
FIG. 5 is a flowchart for illustrating a dynamic partition managing method performed in the on-chip (cache) memory partition controller of FIG. 2.

FIG. 5 is a flowchart for illustrating a dynamic partition managing method performed in the on-chip (cache) memory partition controller 697 of FIG. 2. Referring to FIG. 5, the on-chip (cache) memory partition controller 697 sets a fixed difference in the size of partition to be maintained between upper and lower service groups, in step 6901. Here, the partitions of the classes in the upper service group are larger than those of the classes in the lower service group by the fixed pre-set difference size. Accordingly, the classes in the upper service group having a delay-sensitive property sensitive to transmission delay can securely have an improved transmission delay performance through fast flow search. Consequently, the classes in the upper service group are always allocated a constant space within the on-chip (cache) memory 660 regardless of the circumstances of a track, thus securely providing packet processing of a consistent performance. In this case, as the space of the on-chip (cache) memory 660 for the upper service group is set to be larger than that for the lower service group and the number of upper service classes is smaller than that of lower service classes, the classes in the upper service group can perform faster packet classification than the classes in the lower service group on the average.

Thereafter, the on-chip (cache) memory partition controller 697 equally allocates an on-chip (cache) memory space to store the entries of each flow table in order not to allocate differential QoS service resources to differential classes, in step 6902. Such memory partition allocation periodically repeats. In the present invention, a partition adjusting period is set based on the number of incoming packets.

If the memory partitions for differential classes are adjusted every 100 incoming packets, the number of incoming packets are counted by a counter, and, when the counted number of packets is 0 by reducing the initial set value of 100 by 1 every incoming packet, the memory partitions are re-adjusted. As described above, the on-chip (cache) memory partition controller 697 includes a counter for counting the number of incoming packets in order to set the partition adjusting period. The counter is referred to as a period counter.

When initial size setting of memory partitions is completed in step 6902, the period counter is set as a predefined default period value, in step 6903. As described above, when the differential class partitions of the on-chip (cache) memory 660 are periodically re-adjusted, the size of each memory partition is corrected depending on the service frequency of each of the differential classes in the lower service group. In order to achieve this, the counter data on the service frequency of every differential class must be kept. Hence, the on-chip (cache) memory partition controller 697 has counters each for recording the service frequency of each differential class. The counter is referred to as a service counter. The service counters for respective differential classes are initialized to 0 every time a partition adjustment period starts, in step 6904.

After the four steps 6901 through 6904 for initialization, the on-chip (cache) memory partition controller 697 enters into a packet receiving wait state and maintains the wait state until a new packet flows in, in step 6905. Then, when a packet enters from the incoming packet buffer 70, the on-chip (cache) memory partition controller 697 receives a packet incoming notifying signal, in step 6906. The on-chip (cache) memory partition controller 697 identifies the differential class of the incoming packet in response to the packet incoming notifying signal and increases the value of the service counter of the corresponding class by an increment of 1, in step 6907. Then, the value of the period counter decreases by 1, in step 6908. Thereafter, it is determined whether the value of the period counter is 0, in step 6909.

If the period counter value is 0, a partition adjusting algorithm and a period correcting algorithm are performed, in steps 6910 and 6920. The partition adjusting algorithm performed in step 6910 is shown in detail in FIG. 6, and the partition correcting algorithm performed in step 6920 is shown in detail in FIG. 7.

On the other hand, if the period counter value is not 0, the method goes back to step 6905, in which the on-chip (cache) memory partition controller 697 enters into a packet receiving wait state.

As described above, the on-chip (cache) memory partition controller 697 repeats the above-described procedure to re-adjust the class partitions of an on-chip (cache) memory depending on the frequency of services of each of the differential classes in the lower service group.

Figure 6:
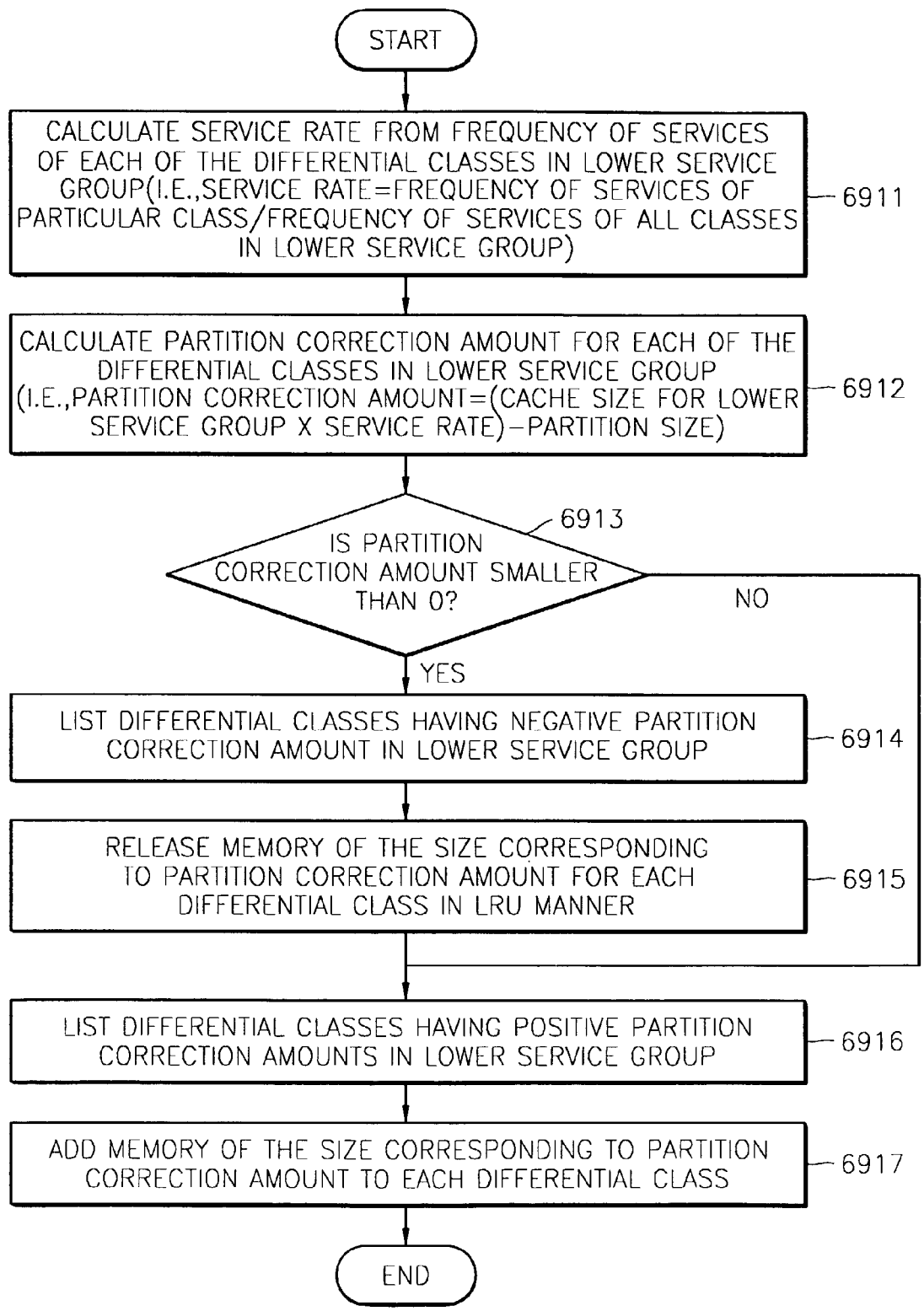
FIG. 6 is a flowchart for illustrating the partition adjusting algorithm implementation of FIG. 5 in greater detail.

FIG. 6 is a flowchart for illustrating the partition adjusting algorithm implementation of FIG. 5 in greater detail. The partition adjusting algorithm is used to determine the sizes of the differential class partitions of the on-chip (cache) memory 660 to be used during a given period with reference to the frequency of services of each differential class occurring during the previous period.

Referring to FIG. 6, first of all, the partition adjusting algorithm according to the present invention calculates the service rate of each of the differential classes in the lower service group, in step 6911. The service rate is defined as the rate of the frequency of services of a particular differential class within a given period with respect to the frequency of services of all of the differential classes in the lower service group during the given period, and calculated as in Equation 1:

$$\text{service rate} = \frac{\text{frequency of services of particular class}}{\text{frequency of services of all of the classes in lower service group}} \quad (1)$$

wherein the frequency of services of all of the classes in the lower service group corresponds to the value of the period.

Assuming that the period is 100, and the overall frequency of services of the lower service group is 80, if the frequency of services of a particular differential class in the lower service group is 20, the service rate of the particular differential class is 0.25, which is obtained by 20/80. The service rate is used to determine the sizes of the differential class partitions of the on-chip (cache) memory 660 to be used for the next period. The size of a memory partition for each of the classes in the lower service group to be used for the next period is the product of the overall size of the on-chip (cache) memory 660 allocated to the lower service group by the service rate.

Thereafter, a partition correction amount, by which the partition for each of the differential classes in the lower service group is adjusted, is obtained, in step 6912. The partition correction amount is obtained by subtracting the size of a partition allocated to a current class from the size of the on-chip (cache) memory partition for the differential classes to be used for the next period, as shown in Equation 2:

$$\text{partition correction amount} = (\text{cache size for lower service group} \times \text{service rate}) - \text{partition size} \quad (2)$$

After the calculation of the partition correction amount, it is determined whether the partition correction amount is negative, in step 6913. In the partition adjusting algorithm according to the present invention, whether the partition correction amount is negative or positive determines how its subsequent process goes.

If it is determined in step 6913 that the partition correction amount is negative, the differential classes having negative partition correction amounts in the lower service group are listed, in step 6914. Then, in order to adjust the on-chip (cache) memory partitions of the listed differential classes, an on-chip (cache) memory area corresponding to the partition correction amount is excluded from the partitioned memory, in step 6915. That is, when a sufficient-sized unused memory partition, which is bigger than the partition correction amount, exists within the on-chip (cache) memory, an unused memory of the size corresponding to the partition correction amount can be excluded from the partitioned memory. However, if the unused memory is smaller than the partition correction amount, part of a currently used memory must be released from being used. In the present invention, the LRU algorithm is used to forcibly release some memory area from being used. According to the LRU algorithm, the memory is released from being used in the order of least recently used memory areas, so that a necessary area of the memory can be returned without degrading the rate of success of the on-chip (cache) memory searching.

When the memory partitions for differential classes having a low service frequency are completely returned by the above-described method, the returned on-chip (cache) memory is allocated to differential classes having a high service frequently.

To do this, first of all, differential classes having positive partition correction amounts in the lower service group are listed, in step 6916. Then, a memory of the size corresponding to the partition correction amount is added to each of the differential classes, in step 6917. In this way, the on-chip (cache) memory partitions of the listed differential classes are adjusted. Here, the added memory is an on-chip (cache) memory returned in step 6915.

In the packet classification algorithm of the on-chip (cache) memory partition controller 697 shown in FIG. 6, the period for which the partitions of an on-chip (cache) memory are adjusted is not fixed but adjusted depending on the circumstances. This increases the rate of successfully searching the on-chip (cache) memory.

The success rate of searching the on-chip (cache) memory can be maximized by performing a partition adjusting algorithm on every incoming packet. However, frequent partition adjusting algorithm operations affect the packet processing performance of a system. Accordingly, an algorithm for controlling the period in which the partitions of an on-chip (cache) memory are adjusted, as shown in FIG. 7, is used to maintain the success rate of an on-chip (cache) memory to a certain level without affecting the packet processing performance.

Figure 7:
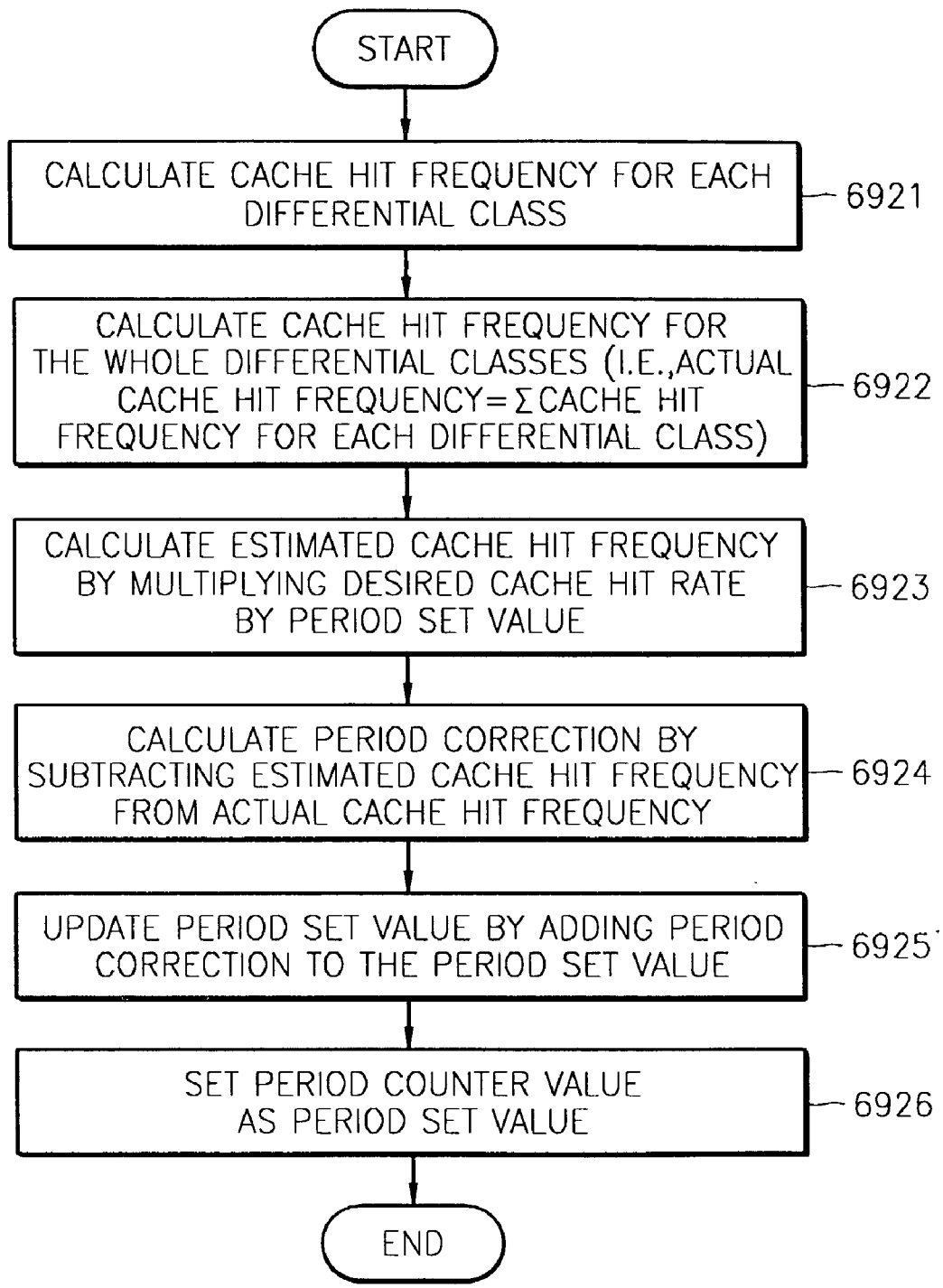
FIG. 7 is a flowchart for illustrating the period correcting algorithm implementation of FIG. 5 in greater detail.

FIG. 7 is a flowchart for illustrating the period correcting algorithm implementation of FIG. 5 in greater detail. The period correcting algorithm of FIG. 7 is performed before a new period starts after a period for which the partition adjusting algorithm is performed.

Referring to FIG. 7, first of all, the period correcting algorithm according to the present invention calculates the cache hit frequency for each differential class, in step 6921. Then, the cache hit frequency for the whole differential classes is calculated using the calculated cache hit frequency for each differential class, in step 6922.

The cache hit frequency for each differential class denotes the frequency of successes achieved in searching each of the classes in an on-chip (cache) memory. The cache hit frequencies for individual differential classes are summed to obtain the overall cache hit frequency ranging within a given period, which is referred to as an actual cache hit frequency. The actual cache hit frequency is expressed as in Equation 3:

$$\text{actual cache hit frequency} = \sum \text{cache hit frequency for each differential class} \quad (3)$$

Subsequently, an estimated cache hit frequency is calculated to be compared with the actual cache hit frequency obtained in step 6922, in step 6923. The estimated cache hit frequency is obtained by multiplying a pre-defined desired cache hit rate by the overall number of incoming packets within a given period. Here, the overall number of incoming packets corresponds to a period set value. Accordingly, the estimated cache hit frequency is calculated as in Equation 4:

$$\text{estimated cache frequency} = \text{period set value} \times \text{desired cache hit rate} \quad (4)$$

When the cache hit rate is set to be 70% and the period set value is set to be 100, if a total of 100 packets have flowed in, the estimated cache hit frequency is 80.

After the actual cache hit frequency and the estimated cache hit frequency are obtained in steps 6922 and 6923, they are subtracted one from the other to obtain a period correction, in step 6924. The period correction is calculated by Equation 5:

$$\text{period correction} = \text{actual cache hit frequency} - \text{estimated cache hit frequency} \quad (5)$$

The obtained period correction is used as a value quantitatively representing whether the actual cache hit frequency is greater than or smaller than a cache hit frequency required by a system.

After the period correction is obtained, a new period set value is obtained using the period correction, in step 6925. Then, the period counter value is set as the obtained new period set value, in step 6926. The new period set value obtained in step 6925 is expressed as in Equation 6:

$$\text{period set value} = \text{period set value} + \text{compensating period} \quad (6)$$

As described above, if the period counter is set as the period set value obtained by Equation 6, the period increases or decreases depending on whether the actual cache hit frequency is greater than or smaller than the cache hit frequency required by a system.

To be more specific, when the actual cache hit frequency exceeds the estimated cache hit frequency, the on-chip (cache) memory partition controller 697 increases the period by the difference between the actual cache hit frequency and the estimated cache hit frequency in order to lower the frequency of operations of the partition adjusting algorithm. When the actual cache hit frequency lacks the estimated cache hit frequency, the on-chip (cache) memory partition controller 697 decreases the period by the difference between the actual cache hit frequency and the estimated cache hit frequency in order to maintain the estimated cache hit frequency.

In the present invention, the trade-off between two performance factors, that is, a cache hit rate and a packet processing speed, is established using an adaptive period adjusting algorithm, thus maximizing the overall performance of packet classification.

The packet classification method according to the present invention can be written as computer codes in a computer readable recording medium. The recording medium includes all types of recording devices in which computer readable data is stored, such as, ROMs, RAMs, CD-ROMs, magnetic tapes, floppy discs, optical data storage devices. Also, the computer codes can be transmitted via a carrier wave such as Internet. In addition, since computer readable recording media are decentralized in a computer system connected to a network, the packet classification method can be stored and performed as computer codes in a decentralization manner.

As described above, in the router according to the present invention and a fast IP packet classification method performed in the router, a memory storing flow tables is provided with a fast internal cache memory and a low-priced external general memory. A packet classification mechanism is differentiated in accordance with the characteristics of each service class, and packet classification is dynamically controlled by periodically referring to the traffic state. Therefore, rapid searching is possible, and the packet classification performance is maximized.

What is claimed is:

1. A router comprising:
   a quality-of-service (QoS) policy client for transforming a QoS policy received from a QoS policy server system into QoS resource control data;
   a flow table processor for establishing a plurality of flow tables in response to the QoS resource control data;
   a packet classifier for classifying incoming packets according to flow on the basis of the data stored in the flow tables and generating operation codes, wherein the packet classifier includes a first memory for storing recently searched table entries among the data in the flow tables: and
   a QoS resource controller for controlling each of the incoming packets to be forwarded on a flow-by-flow basis in response to the operation codes and controlling the scheduling of outgoing resources.

2. The router of claim 1, further comprising a second memory for storing the plurality of flow tables.

3. The router of claim 2, wherein the packet classifier further comprises:
   a multi-field search key extractor for extracting multi-field data about the incoming packets;
   a differential class classifier for classifying the incoming packets according to differential classes;
   a plurality of differential class flow table searchers for searching for the data in the flow tables for respective differential classes;
   a partition controller for controlling the sizes of the partitions of the first memory in units of differential classes;
   a plurality of memory matchers for providing an interface enabling to search the flow tables included in the second memory if the first memory is not successfully searched; and
   an output signal mediator for mediating the results of the flow table search so that they are sequentially output.

4. The router of claim 3, wherein the second memory is a dynamic random access memory (DRAM) installed outside the packet classifier.

5. The router of claim 3, wherein the first memory is a cache installed within the packet classifier.

6. The router of claim 3, wherein the first memory includes a plurality of flow tables partitioned so as to match with the flow tables included in the second memory.

7. The router of claim 3, wherein the plurality of differential class flow table searchers are matched with the flow tables included in the first memory in order to perform parallel flow searching.

8. The router of claim 3, wherein the plurality of memory matchers are matched with the plurality of flow tables included in the second memory in order to search the plurality of flow tables included in the second memory.

9. The router of claim 8, wherein the plurality of memory matchers store the results of the successful searching of the flow tables of the second memory in the plurality of flow tables of the first memory.

10. The router of claim 3, wherein the partition controller classifies the differential classes of the flow tables to be stored in the first memory into upper and lower service groups, and the partition of the upper service group is larger than that of the lower service group.

11. The router of claim 10, wherein the partition controller partitions the upper service group into equal fixed parts.

12. The router of claim 10, wherein the partition controller unequally partitions the lower service group in proportion to the frequency of services provided for each of the differential classes.

13. The router of claim 12, wherein, when the upper service group is determined to be partitioned to a size smaller than the size of the partition allocated during a previous period, the partition controller releases an already-occupied partition of the first memory from being used, in the order of least recently-used memory partitions.

14. The router of claim 11 or 12, wherein the period of the partition of each of the upper and lower service groups varies according to the difference between the actual hit frequency of the first memory counted by differential classes and the desired hit frequency of the first memory.

15. The router of claim 14, wherein the partition controller increases the partition period by the difference of the actual hit frequency and the desired hit frequency if the actual hit frequency exceeds the desired hit frequency.

16. The router of claim 14, wherein the partition controller decreases the partition period by the difference of the actual hit frequency and the desired hit frequency if the actual hit frequency lacks the desired hit frequency.

17. The router of claim 3, wherein the output signal mediator stores the flow table search results generated in parallel in its first-in first-out (FIFO) memory, and sequentially outputs the flow table search results in an FIFO manner.

18. A packet classification method comprising:
    extracting a multi-field search key from an incoming packet;
    extracting a differential service code point field from the extracted multi-field search key;
    classifying the incoming packet according to differential classes in response to the extracted differential service code point field;
    searching a first flow table group corresponding to the differential service code point field in response to the multi-field search key;
    extracting operation codes from the search result if the first flow table group search succeeded; and
    searching a second flow table group corresponding to the differential service code point field in response to the multi-field search key if the first flow table group search failed, and extracting operation codes from, the second flow table group search result, wherein the first flow table group is stored in a first memory and the second flow table group is stored in a second memory.

19. The packet classification method of claim 18, wherein the first memory is a cache installed within a packet classifier.

20. The packet classification method of claim 18, wherein the second memory is a DRAM installed outside the packet classifier.

21. The packet classification method of claim 18, wherein the first flow table group stores recently searched result.

22. The packet classification method of claim 18, wherein the first flow table group is partitioned to be matched with a plurality of flow tables included in the second flow table group.

23. The packet classification method of claim 18, further comprising:
    classifying the first memory into an upper service group and a lower service group;
    partitioning the upper and lower service groups; and
    correcting the period for partitioning each of the upper and lower service groups.

24. The packet classification method of claim 23, wherein the partitions of the upper service group are larger than those of the lower service group.

25. The packet classification method of claim 23, wherein the upper service group is partitioned to equal fixed-sized parts.

26. The packet classification method of claim 23, wherein the lower service group is unequally partitioned in proportion to the frequency of services of each differential class provided.

27. The packet classification method of claim 23, wherein the service group partitioning step comprises:
    calculating a service rate from the frequency of services of each differential class in the lower service group provided;
    calculating a partition correction amount for each differential class in the lower service group;
    listing differential classes having negative correction amounts in the lower service group, if the partition correction amounts are negative;
    excluding a memory space corresponding to the partition correction amount for each of the listed differential classes from the partitioned memory;
    listing differential classes having positive correction amounts in the lower service group, if the partition correction amounts are positive; and
    adding a memory space corresponding to the partition correction amount for each of the listed differential classes to the partitioned memory.

28. The packet classification method of claim 27, wherein the service rate is obtained by dividing the frequency of services of a differential class by the frequency of services of all of the differential classes in the lower service group.

29. The packet classification method of claim 27, wherein the partition correction amount for each of the differential classes is obtained by subtracting the size of a current partition allocated to each differential class from the product of the memory size of the lower service group by the service rate.

30. The packet classification method of claim 27, wherein a first memory area is excluded from the partitioned first memory in the order of least recently used memory areas.

31. The packet classification method of claim 23, wherein the partitioning period correcting step comprises:
    calculating the hit frequency for each differential class;
    calculating the hit frequency for all differential classes in response to the calculated hit frequency for each differential class;
    obtaining an actual hit frequency by summing the hit frequencies for respective differential classes;
    obtaining an estimated hit frequency by multiplying a pre-set desired hit rate by the number of packets incoming during a given period;

calculating a period correction amount by subtracting the estimated hit frequency from the actual hit frequency;

updating a set period value by adding the set period value to the period correction value; and setting the value of a period counter as the set period value.

32. A computer recording medium in which a computer program is recorded, the program when executed by a processor performs a method described in any of claims 18 through 31.

* * * * *